United States Patent [19]

Yokoyama et al.

[11] Patent Number: 4,883,951

[45] Date of Patent: Nov. 28, 1989

[54] METHOD AND SYSTEM FOR DETECTING WHETHER AN OPTICAL SYSTEM IS IN FOCUS USING AN IMPROVED INTERPOLATION TECHNIQUE

[75] Inventors: Shotaro Yokoyama; Takashi Nishinbe, Kawasaki, both of Japan

[73] Assignee: Fuji Electric Company Ltd., Kawasaki, Japan

[21] Appl. No.: 326,799

[22] Filed: Mar. 21, 1989

Related U.S. Application Data

[63] Continuation of Ser. No. 96,530, Sep. 15, 1987, abandoned.

[30] Foreign Application Priority Data

Nov. 10, 1986 [JP] Japan .................. 61-265469

[51] Int. Cl.$^4$ .................. G01J 1/20; G03B 3/00
[52] U.S. Cl. .................. 250/201; 250/204; 354/402; 354/406
[58] Field of Search .................. 250/201, 204; 354/402, 354/406-409; 356/1, 4

[56] References Cited

U.S. PATENT DOCUMENTS

| | | | |
|---|---|---|---|
| 4,004,852 | 1/1977 | Pentacost .................. | 356/1 |
| 4,333,007 | 6/1982 | Langlais et al. .................. | 250/201 |
| 4,336,450 | 6/1982 | Utagawa et al. .................. | 250/204 |
| 4,412,741 | 11/1983 | Stein .................. | 356/1 |
| 4,556,789 | 12/1985 | Shotaro et al. . | |
| 4,559,446 | 12/1985 | Suzuki .................. | 250/201 |
| 4,561,749 | 12/1985 | Utagawa .................. | 354/406 |
| 4,572,476 | 2/1968 | Oinone .................. | 250/201 PF |
| 4,602,153 | 7/1986 | Suzuki .................. | 250/201 |
| 4,606,630 | 8/1986 | Haruki et al. .................. | 356/1 |
| 4,611,910 | 9/1986 | Suzuki et al. .................. | 356/1 |
| 4,640,613 | 2/1987 | Yokoyama et al. .................. | 356/1 |
| 4,652,119 | 3/1987 | Suzuki et al. .................. | 356/1 |
| 4,695,156 | 9/1987 | Taft .................. | 356/1 |
| 4,709,138 | 11/1987 | Suda et al. .................. | 250/201 |

*Primary Examiner*—Edward P. Westin
*Attorney, Agent, or Firm*—Spencer & Frank

[57] ABSTRACT

In a focus detection system in which light from an object is incident on at least two photosensor arrays via an optical system to form two images on the photosensor arrays, the relative displacement between the two images is determined in order to detect whether the optical system is in focus or not. A correction term which is formed by $f(i_0+2)$ and $f(i_0+1)$ or $f(i_0-2)$ and $f(i_0-1)$ is added to $f(i_{0-1})-f(i_0)$ or $f(i_0+1)-f(i_0)$, so that the amount of image deviation between the two images is obtained. Here $i_0$ is the value of $i$ when a function $f(i)$ is minimized, the function $f(i)$ expressing the inconsistency between the two images, corresponding to an amount of relative displacement $i \times p$ between the two images obtained discretely. The symbol p represents the pitch of the at least two photosensor arrays.

3 Claims, 3 Drawing Sheets

METHOD AND SYSTEM FOR DETECTING WHETHER AN OPTICAL SYSTEM IS IN FOCUS USING AN IMPROVED INTERPOLATION TECHNIQUE

This application is a continuation of application Ser. No. 07/096,530, filed Sep. 15th, 1987, now abandoned.

BACKGROUND OF THE INVENTION

1. Field of the Invention

The present invention relates to a method and system for detecting whether or not an optical system is in focus.

2. Description of the Prior Art

In one example of a conventional focus detection system, light beams at different portions of the light radiated by or reflected from an object are incident through a lens on, for example, two photosensor arrays. Proper focus, or the "focused condition," can be detected from the relative displacement between the two images of the object which are formed on the two photosensor arrays. This technique is disclosed, for example, in U.S. Pat. Nos. 4,004,852 and 4,412,741.

In order to improve the accuracy in focus detection, it is necessary to accurately obtain the amount of image deviation between the two images formed on the two photosensors. In the focused condition, this amount is zero, i.e., the two images coincide with each other. It is, however, not possible to directly obtain the amount of image deviation with an accuracy and a resolution higher than the accuracy and resolution determined by the geometrical arrangement (pitch) of the photosensors. Consequently, an approach has been used in which the amount of image deviation is obtained at the accuracy of the photosensor pitch, and then the deviation thus-obtained is used to perform an interpolation computation, so that the resulting image deviation amount has an accuracy higher than that determined by the pitch of the photosensors. This approach is disclosed in Japanese Patent Application Laid-open No. 60-37,513 (which is related to U.S. Pat. No. 4,561,749, issued Dec. 31, 1985), and will now be explained.

FIG. 3 is a block diagram showing an example of a conventional focus detection system. FIGS. 4A–4C provide an explanation of the interpolation method.

In FIG. 3, reference numerals 1A and 1B denote photosensor arrays, each having a plurality of sensors arrayed at equal intervals (pitch). Light from an object is directed through an optical system (not shown) and impinges on the photosensors 1A and 1B to form images of the object. The amount of a relative displacement X between these images can be used to generate a signal representing an in focus condition or an out of focus condition. That is, one image falls on photosensor array 1A at a particular position relative to array 1A and the other image falls on photosensor array 1B at a particular position relative to array 1B, and the particular positions relative to the respective arrays will be displaced by a distance or amount X unless the optical system is in focus (in which case X=0, and the position of the first image relative to array 1A is the same as the position of the second image relative to array 1B). Reference numerals 2A and 2B denote analog/digital converters (A/D converters) which convert analog outputs from the respective sensors in the photosensor arrays 1A and 1B into digital signals. Reference numeral 3 denotes a computation processing unit such as a microcomputer which receives the digital signals from the A/D converters 2A and 2B to calculate the amount of relative displacement X between the two images. The position of a field lens (not shown) is adjusted in accordance with this value X. In this manner, a conventional focus detection system is generally arranged by using a computation processing unit.

Assuming that photosensor array 1A is positioned to the left and that photosensor array 1B is positioned to the right, and that array 1A has a row of M1 sensors and array 1B has a row of M2 sensors, the output signals from the sensors in array 1A can be conveniently represented as L(1), L(2), ..., L(M1) while the output signals from the sensors in array 1B are represented as R(1), R(2), ..., R(M2). If the relative displacement amount is zero, indicating that the optical system is in focus, L(1) will equal R(1), L(2) will equal R(2), and so on. On the other hand the optical system might be focussed too near or too far, so that the pattern of output signals from one array would be shifted relative to the pattern of output signals from the other array. For example, if the relative displacement amount X is such that the image impinging on array 1B is shifted to the left by precisely the width of one sensor, with respect to the image impinging on array 1A, L(1) would equal R(2), L(2) would equal R(3), and so forth. For images that are shifted by an integral multiple of the pitch p of the arrayed photosensors, the amount of relative displacement X between the two images is given by X=i.p, where i is an integer representing the number of photosensors by which the image falling on one array has been shifted with respect to the image falling on the other array. Thus, the relative displacement amount X can be found, to an accuracy which depends on the photosensor pitch p, by determining how far (in terms of the number of photosensors) the pattern of output signals from one array must be shifted in order to best match the pattern of output signals from the other array. The best match can be found using an evaluation function f(i) which represents the degree of inconsistency between the two images for a range of possible values of the shift amount.

An evaluation function f(i) is defined as follows:

$$f(i) = \sum_{j} |L(j) - R(i + j)| \tag{1}$$

In equation (1), j is an integer representing a photosensor position in both arrays. For example, j=0 identifies the 0th photosensor in both arrays, j=1 identifies photosensor number one in both arrays, and so on. The number i is an integer representing a shift amount, or the difference between a photosensor position in one array and a photosensor position in the other array. For example, i=2 designates a relative photosensor position in one array that spaced two photosensors apart from the corresponding relative photosensor position in the other array. It will be apparent that, for given values of the shift amount i, equation (1) represents a comparison of the pattern of output signals from one of the left photosensor array with the pattern of output signals from the right photosensor array on a sensor-by-sensor basis. The integer i can be positive or negative, corresponding to the optical system being focused too near or too far. After equation (1) is evaluated for different values of i in a predetermined range (which includes the focused condition where i=0), the minimum value of f(i) is selected as the best match between the patterns of output signals. The value $i_0$ is defined to be the value of i that gives the minimum value of f(i).

If the relative displacement between the two images on the photosensor arrays 1A and 1B is $i_0 \times p$, then $f(i_0)=0$. However, normally, it is rare that X is exactly an integral multiple of the photosensor pitch p, or that the shapes of the image signals coming from the two photosensors are identical with each other (apart from the relative displacement between the two images), so that usually $f(i) > 0$.

A microcomputer can easily perform the processing to find the minimum value of f(i), i.e., the true amount of relative displacement over the range $i = -N_1, \cdots, +N_2$. This computation, however, is merely a first-order approximation, as described above, so that interpolation is necessary to perform more accurate detection.

FIG. 4A shows a conventional example of this interpolation method.

With reference to FIG. 4A, it will be recalled that $i_0$ is the value of i that gives the minimum value of f(i) for amounts of relative displacement indicated by i (an integer) x p, and it is assumed that:

$$f(i_{-1}) > f(i_{+1}) \tag{2}$$

The inequality relationship (2) indicates that the true image deviation amount lies between $i_0$ and $i_{+1}$. When $f(i_{-1}) < f(i_{+1})$, $i_{-1}$ and $i_{+1}$ are reversed in relationship (2) and then the same procedure is followed. Note that $i_{-1} \equiv i_0 - 1$ and $i_{+1} \equiv i_0 + 1$.

In the conventional interpolation method shown in FIG. 4A, a straight line $L_0$ is first drawn to link the point $(i_{-1}, f(i_{-1}))$ with the point $(i_0, f(i_0))$. Then, a straight line $L_1$ having a slope, the absolute value of which is equal to that of the straight line $L_0$ and which has a sign opposite to that of the line $L_0$, is drawn through the point $(i_{+1}, f(i_{+1}))$. Then, the interpolated value $I = X/p$ of the abscissa of the point where the straight lines $L_0$ and $L_1$ intersect is the final image deviation amount obtained by interpolation.

This interpolation method provides a correct value of X when f(i) is in the form of straight lines like the straight lines $L_0$ and $L_1$ shown in FIG. 4A. However an error will occur when, as shown in FIG. 4B and FIG. 4C, f(i) has curvature. That is, if a straight line $L_2$ having a slope of the same absolute value as that of the straight line $L_0$ and with a sign opposite to that of the line $L_0$, as shown by the broken lines in FIG. 4B and FIG. 4C, is drawn through a point $(X_{0/p} + (X_{0/p} - i_0), f(i_0))$ which is symmetrical to the point $(i_0, f(i_0))$ with respect to the straight line $i = X_{0/p}$, then the point of intersection between the lines $L_0$ and $L_2$ gives the correct value for the real image deviation amount $X_0$. This is because f(i) is symmetrical with respect to the straight line $i = X_{0/p}$, at least in the vicinity of $X_0$. But, as shown by the dash-and-dot line $L_1$ in FIGS. 4B and 4C, the actual line $L_1$ passes through a point other than the point $(X_{0/p} + (X_{0/p} - i_0), f(i_0))$. Accordingly, as is clear from FIGS. 4B and 4C, when the curve f(i) is downwards convex, as in FIG. 4B, $X > X_0$. When the curve f(i) is upwards convex, as in FIG. 4C, $X < X_0$.

This error results from the fact that the absolute value of the slope is fixed to $f(i_{-1}) - f(i_0)$, and the fact that this slope value itself is applied to the straight lines $L_0$ and $L_1$ in FIG. 4A.

As is clear from the above description, the conventional interpolation method results in a comparatively large error between the image deviation amount obtained by the interpolation and the true image deviation amount. Hence, there is a problem in that the image deviation amount cannot be obtained with satisfactory accuracy.

SUMMARY OF THE INVENTION

It is, therefore, an object of the present invention to provide a focus detection system which allows detection of whether an optional system is in focus with a high degree of accuracy.

In the present invention, a correction term which is formed by $f(i_0+2)$ and $f(i_0+1)$ or $f(i_0-2)$ and $f(i_0-1)$ is added to $f(i_0-1)-f(i_0)$ or $f(i_0+1)-f(i_0)$, so that an amount of image deviation of two images is obtained, where $i_0$ is the value giving the minimum value of f(i) in case of a function f(i) expressing the inconsistency between the two images with respect to a relative displacement $i \times p$ between the two images obtained discretely.

More specifically, the present invention provides a focus detection system in which light from an object is incident on at least two photosensor arrays via an optical system to form two images on the photosensor arrays and a relative displacement amount X between the two images is obtained to determine whether the optical system is in focus or not, and the system comprises:

means for storing a function f(i) expressing inconsistency between the two images, said inconsistency corresponding to an amount of relative displacement $i \times p$ obtained by multiplying the pitch p of the photosensor arrays by an integer i, and a value $i_0$ that is the value of i when the value of f(i) is at a minimum;

means for obtaining function values $f(i_0)$, $f(i_0-1)$, $f(i_0-2)$, $f(i_0+1)$ and $f(i_0+2)$ corresponding to $i_0$, $(i_0-1)$, $(i_0-2)$, $(i_0+1)$ and $(i_0+2)$, respectively;

means for computing an amount $I = X/p$ (p = pitch of the arrayed photosensors in the at least two arrays) from the function values, the amount I being given by formulas (1) and (2) below:

$$I = i_0 + \tfrac{1}{2} - \{f(i_0+1) - f(i_0)\}/A \tag{1}$$

where
$A = 2\{B_1 + K_1(B_1 - B_2)\}$
$B_1 = f(i_0-1) - f(i_0)$
$B_2 = f(i_0+2) - f(i_0+1)$
$K_1 =$ a constant between 0 and 0.5

$$I = i_0 - \tfrac{1}{2} + \{f(i_0-1) - f(i_0)\}/C \tag{2}$$

where
$C = 2\{D_1 + K_1(D_1 - D_2)\}$
$D_1 = f(i_0+1) - f(i_0)$
$D_2 = f(i_0-2) - f(i_0-1)$
$K_1 =$ a constant between 0 and 0.5 means for comparing the function value $f(i_0-1)$ with the function value $f(i_0+1)$ to judge whether (a) $f(i_0-1) > f(i_0+1)$,
(b) $f(i_0-1) = f(i_0+1)$, or
(c) $f(i_0-1) < f(i_0+1)$; and means for obtaining the amount I given by the formula (1) in the case of (a), or given by $I = i_0$ in the case of (b), or given by formula (2) in case of (c).

Another aspect of the present invention is to provide a focus detection method in which light from an object is incident on at least two photosensor arrays via an optical system to form two images on the photosensor arrays and a relative displacement amount X between the two images is obtained to determine whether the optical system is in focus or not, and the method comprises the steps of:

obtaining function values $f(i_0)$, $f(i_0-1)$, $f(i_0-2)$, $f(i_0+1)$ and $f(i_0+2)$ for a function $f(i)$ expressing inconsistency between the two images, said inconsistency corresponding to an amount of relative displacement obtained by multiplying the pitch p of the photosensor arrays by an integer i in the case of $i_0$, $(i_0-1)$, $(i_0-2)$, $(i_0+1)$ and $(i_0+2)$, respectively, $i_0$ being the value of i when the value of $f(i)$ is at a minimum;

computing an amount $I = X/p$ (p = pitch of the arrayed photosensors in the at least two photosensor arrays) from the function values, the amount I being given by formulas (1) and (2) below:

$$I = i_0 + \tfrac{1}{2} - \{f(i_0+1) - f(i_0)\}/A \qquad (1)$$

where
$A = 2\{B_1 + K_1(B_1 - B_2)\}$
$B_1 = f(i_0-1) - f(i_0)$
$B_2 = f(i_0+2) - f(i_0+1)$
$K_1 = $ a constant between 0 and 0.5

$$I = i_0 - \tfrac{1}{2} + \{f(i_0-1) - f(i_0)\}/C \qquad (2)$$

where
$C = 2\{D_1 + K_1(D_1 - D_2)\}$
$D_1 = f(i_0+1) - f(i_0)$
$D_2 = f(i_0-2) f(i_0-1)$
$K_1 = $ a constant between 0 and 0.5 comparing the function value $f(i_0-1)$ with the function value $f(i_0+1)$ to judge whether (a) $f(i_0-1) > f(i_0+1)$,
(b) $f(i_0-1) = f(i_0+1)$, or
(c) $f(i_0-1) < f(i_0+1)$; and obtaining the amount I given by formula (1) in the case of (a), or given by $I = i_0$ in the case of (b), or given by formula (2) in case of (c).

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

The following description will assume a familiarity with the concepts discussed above in the "Description of the Prior Art" section.

Figure 1:
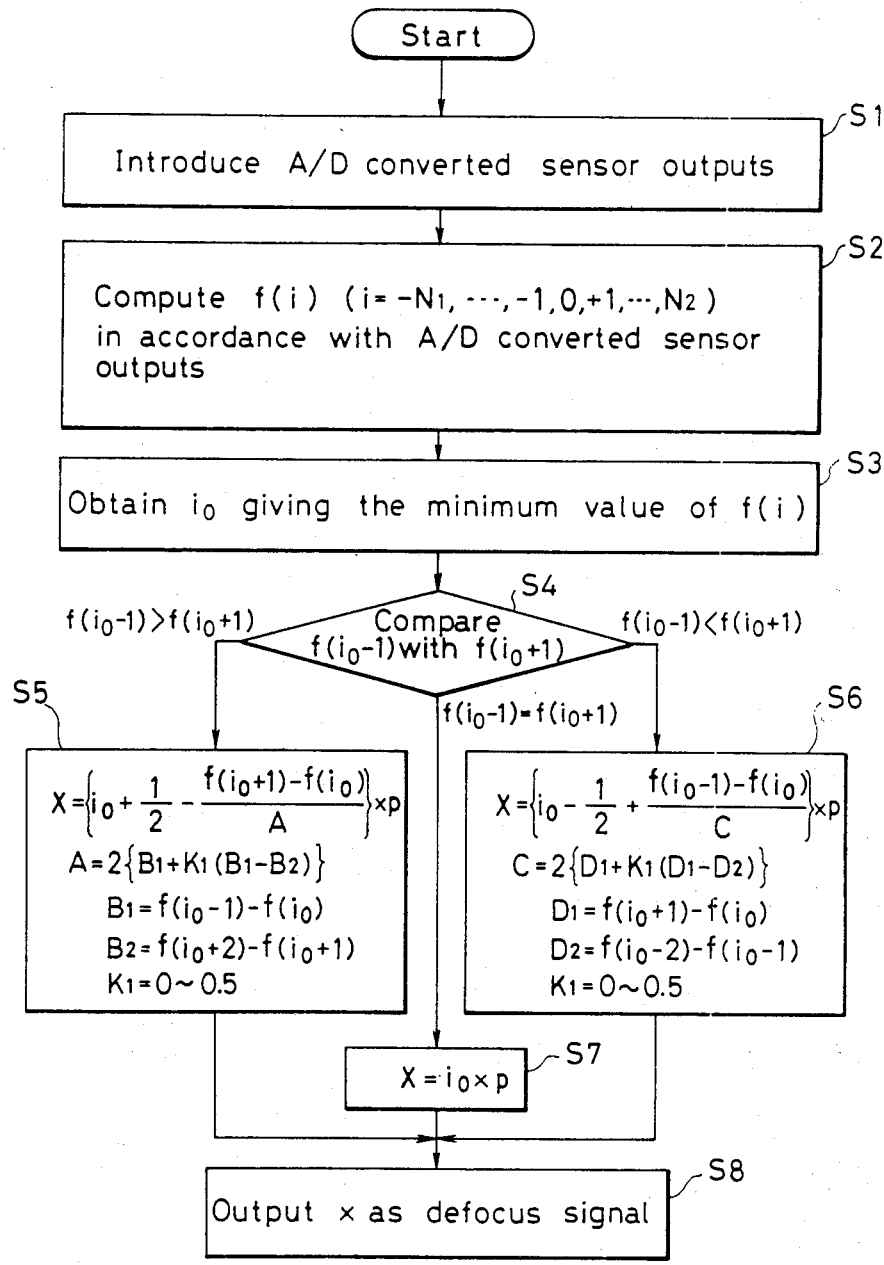
FIG. 1 is a flowchart showing the processing procedure in an embodiment of the present invention.
Figure 3:
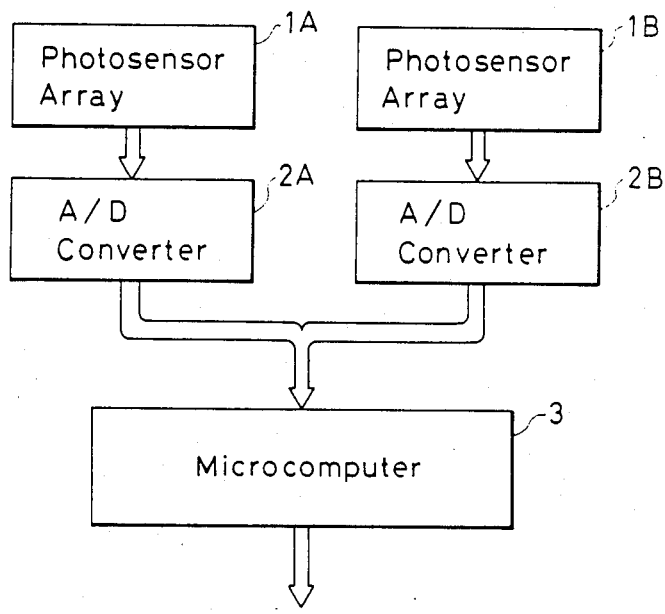
FIG. 3 is a block diagram showing the general arrangement of a focus detection system.

FIG. 1 is a flowchart showing an embodiment of the present invention. The control procedure shown in FIG. 1 can be performed by the microcomputer 3 shown in FIG. 3. That is, a software program for this control procedure can be stored in a read only memory (ROM) in the microcomputer 3. Consequently, the following explanation refers to the processing by the computation processing unit or microcomputer 3.

First, in step S1, the processing starts by introducing digital output signals from A/D converters 2A and 2B, to which the output signals from photosensor arrays 1A and 1B are supplied. In accordance with these digital output signals, in step S2, computation of the function $f(i)$ (equation (1), above) for various i $(i = -N_1, \cdots, -1, 0, +1, \cdots, +N_2)$ is performed. The function $f(i)$ shows the degree of inconsistency between the two images and corresponds to an image deviation amount or an amount of relative displacement obtained by multiplying the pitch p of each of the photosensor arrays 1A and 1B by an integer i, representing the number of photosensors by which the image falling on one of the photosensor arrays 1A and 1B is shifted with respect to the image falling on the other of the photosensor arrays 1A and 1B. Then, in step S3 the value of i which provides the minimum value of $f(i)$ is obtained as $i_0$.

Next, in steps S4, S5 and S6, calculations described later are performed, based upon the function value $f(i)$. Then, in step S7, a focus detection signal (or defocus signal) is outputted.

The principle of this invention will now be explained.

Figure 2:
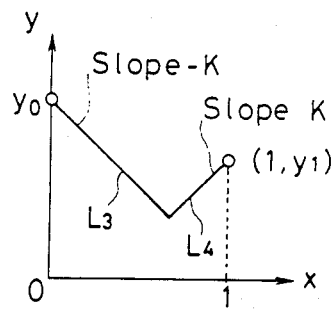
FIG. 2 is a graph used to explain the principle of an interpolation method according to the present invention.

First, a general situation will be considered with reference to FIG. 2. In FIG. 2, we assume that a straight line $L_3$ with a slope $-K$ passes through the point $(0, y_0)$, and a straight line $L_4$ with a slope K passes through the point $(1, y_1)$. The X coordinate at the point of intersection of those straight lines $L_3$ and $L_4$ is given by the following equation.

$$x = \frac{1}{2} - \frac{y_1 - y_0}{2K} \qquad (3)$$

As equation (3) indicates, when $K \to \infty$, $X \to \tfrac{1}{2}$, and if K is reduced, then X is decreased, when $y_1 - y_0 > 0$. On the other hand, X is increased as K is reduced when $y_1 - y_0 < 0$. Note that when K is increased, the opposite relationship is obtained.

Figure 4A:
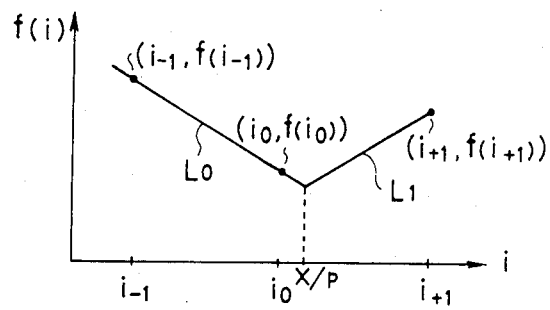
FIGS. 4A-4C are graphs used to explain a conventional interpolation method and an interpolation method according to the present invention.
Figure 4B:
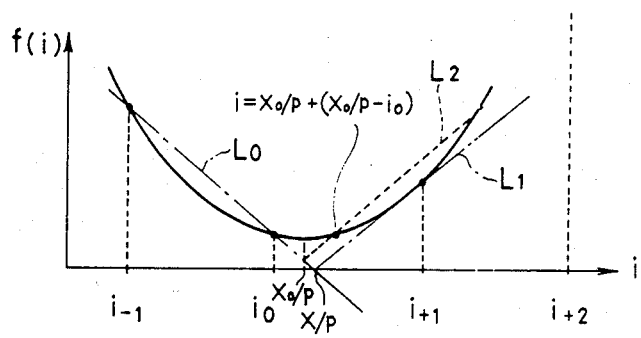
Figure 4C:
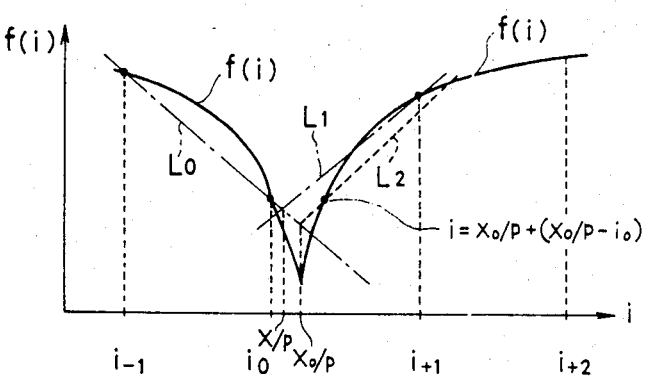

Turning back now to the situations shown in FIGS. 4B and 4C, the relationship $f(i_{+1}) > f(i_0)$ applies. In FIG. 4B, $X/p > X_0/p$, so that if the absolute values of the slopes of the straight lines $L_0$ and $L_1$ are decreased, the value $X/p$ will approach the true image deviation amount $X_0/p$ more closely. In FIG. 4C, $X/p < X_0/p$, so that if the absolute values of the slopes of the straight lines $L_0$ and $L_1$ are increased, the value $X/p$ approaches the value $X_0/p$.

With the above in view, the following expression will now be used as the absolute values of the slopes of the straight lines $L_0$ and $L_1$, instead of $\{f(i_{-1}) - f(i_0)\}$:

$$f(i_{-1}) - f(i_0) + C[\{f(i_{-1}) - f(i_0)\} - \qquad (4)$$
$$\{f(i_{+2}) - f(i_{+1})\}]$$

Essentially, expression (4) is obtained by adding the following correction term to $f(i_{-1}) - f(i_0)$:

$$C[\{f(i_{-1}) - f(i_0)\} - \{f(i_{+2}) - f(i_{+1})\}] \qquad (5)$$

This means that a weighting value C is employed to take the amount of slope of a straight line linking the point $(i_{+1}, f(i_{+1}))$ and the point $(i_{+2}, f(i_{+2}))$ into account. In other words, $g(i) = f(i-1) - f(i)$ is considered as the slope of $f(i)$, and the optimum slope $g(i_0) = g(i) + C\Delta g(i)$ is calculated from $g(i)$ and $\Delta g(i) = g(i) - g(i+1)$. This approach shows that C is a positive value. Here, $X_0/p$ is closer to $i_0$ than to $i_{+1}$, so that it is suitable that $C<0.5$. In fact, in the situation shown in FIG. 4B, expression (5) gives a negative result, so that the absolute values of the slopes of the straight lines $L_0$ and $L_1$ is reduced. In the situation shown in FIG. 4C, expression (5) gives a positive result, so that the absolute values of the slopes of the straight lines $L_0$ and $L_1$ increase, and $X/p$ approaches the value of $X_0/p$.

If expression (4) is substituted in expression (3), and letting $y_{-1}=f(i_{-1})$, $y_0=f(i_0)$, $y_1=f(i_{+1})$ and $y_2=f(i_{+2})$ for simplicity, the image deviation amount is finally given by the following formula:

$$i_0 + \frac{1}{2} - \frac{y_1 - y_0}{2[(y_{-1} - y_0) + C\{(y_{-1} - y_0) - (y_2 - y_1)\}]} \quad (6)$$

Further, this formula gives an interpolated value $I = X/p$, and formula (6) must be multiplied by the photosensor pitch p, to yield the image deviation amount.

Furthermore, as described above, expression (6) is applied when $f(i_{-1}) > f(i_{+1})$, that is, when the true value $X_0/p$ is determined to exist between $i_0$ and $i_{+1}$. When $f(i_{-1}) < f(i_{+1})$, that is, when the true value is determined to exist between $i_{-1}$ and $i_0$, the following formula is derived by the same approach (substituting $y_1$ for $y_{-1}$, $y_{-1}$ for $y_1$, and $y_{-2}$ for $y_2$).

$$i_0 - \frac{1}{2} + \frac{y_{-1} - y_0}{2[(y_1 - y_0) + C\{(y_1 - y_0) - (y_{-2} - y_{-1})\}]} \quad (7)$$

Here, $y_{-2}=f(i_{-2})$, and both expressions (6) and (7) give values which express the number of times by which the interpolated value is multiplied by the photosensor pitch p.

In this manner, an image deviation amount can be obtained more precisely. The processing for obtaining the image deviation amount can be performed by the computation processing unit 3 in accordance with the procedure in step S4 - step S8 as shown in FIG. 1.

That is, at step S4, a comparison of $f(i_0-1)$ with $f(i_0+1)$ is made. If $f(i_0-1)>f(i_0+1)$, then the procedure goes to step S5 where formula (6) is computed. On the other hand, if $f(i_0-1)<f(i_0+1)$, the procedure goes to step S6 where formula (7) is computed. Note that if $f(i_0-1)=f(i_0+1)$, then $i_0$ itself is the image deviation amount, so that $X_0/p=i_0$ (see step S7).

In this manner, either one of formula (6), formula (7) or $X_0/p=i_0$ is used to produce a defocus signal output in step S8.

While in this embodiment, the result of either formula (6) or (7) that shows the image deviation or defocus amount indicated as a multiple of the sensor pitch p, or the value $X/p=i_0$ is outputted, this value can be multiplied, if necessary, by the photosensor pitch p to obtain an absolute image deviation value in $\mu$m, as a matter of course.

The image deviation amount X thus obtained results from a highly accurate interpolation computation, so that focussing control can also be performed more precisely. It should also be noted that simulations using the above method have given results confirming the ability of this method to detect an image deviation amount more accurately than conventional methods.

The present invention incorporates a highly accurate interpolation calculation by using discretely obtained values for the amount $i \times p$ of an image displacement and for the function $f(i)$ expressing degree of inconsistency of the two images, so that the amount of image displacement can be detected more accurately, and accordingly precise focus adjustment can be attained.

What is claimed is:

1. A focus detection system in which light from a object is incident on first and second photosensor arrays via an optical system to form a first image on the first array and a second image on the second array to obtain a relative displacement amount X between the first image with respect to the first array and the second image with respect to the second array, so as to determine whether said optical system is in focus or not, each array generating a respective pattern of signals in response to light falling on the photosensors of the respective array, said system comprising:

means for storing a function $f(i)$ expressing inconsistency between the pattern of signals from the first array and the pattern of signals from the second array when the patterns are shifted with respect to one another by a shift amount i and compared with each other, the shift amount i being an integer which represents the difference between a photosensor position in the first array and a photosensor position in the second array;

means for obtaining function values $f(i_0)$, $f(i_0-1)$, $f(i_0-2)$, $f(i_0+1)$ and $f(i_0+2)$ corresponding to $i_0$, $(i_0-1)$, $(i_0-2)$, $(i_0+1)$ and $(i_0+2)$, were $i_0$ is the value of the shift amount i when $f(i)$ is at a minimum;

means for computing an amount $I=X/p$ (p = pitch of the arrayed photosensors in the photosensor arrays) from said function values, said amount I being given by formulas (1) and (2) below:

$$I=i_0+\tfrac{1}{2}-\{f(i_0+1)-f(i_0)\}/A \quad (1)$$

where
$A=2\{B_1+K_1(B-B_2)\}$
$B_1=f(i_0-1)-f(i_0)$
$B_2=f(i_0+2)-f(i_0+1)$
$k_1=$ a constant between 0 and 0.5

$$I=i_0-\tfrac{1}{2}+\{f(i_0-1)-f(i_0)\}/C \quad (2)$$

where
$C=2\{D_1+K_1(D_1-D_2)\}$
$D_1=f(i_0+1)-f(i_0)$
$D_2=f(i_0-2)-f(i_01)$
$K_1=$ a constant between 0 and 0.5 means for comparing said function value $f(i_0-1)$ with said function value $f(i_0+1)$ to judge whether
(a) $f(i_0-1)>f(i_0+1)$,
(b) $f(i_0-1)=f(i_0+1)$, or
(c) $f(i_0-1)<f(i_0+1)$; and means for obtaining said amount I given by said formula (1) in the case of (a), or given by $I=i_0$ in the case of (b), or given by said formula (2) in the case of (c).

2. A focus detection method in which light from an object is incident on first and second photosensor arrays via an optical system to form a first image on the first array and a second image on the second array to obtain a relative displacement amount X between the first image with respect to the first array and the second image with respect to th second array, so as to determine whether said optical system is in focus or not, each array generating a respective pattern of signals in response to light falling on the photosensors of the respective array, said method comprising the steps of:

obtaining function values $f(i_0)$, $f(i_0-1)$, $f(i_0-2)$, $f(i_0+1)$ and $f(i_0+2)$ for a function $f(i)$ expressing inconsistency between the pattern of signals from the first array and the pattern of signals from the second array when the patterns are shifted with respect to one another by a shift amount i and compared with each other, the shift amount i being an integer which represents the difference between a photosensor position in the first array and a photosensor position in the second array, $i_0$ being the value of i when the value of $f(i)$ is at a minimum;

computing an amount $I = X/p$ (p = pitch of the arrayed photosensors in the photosensor arrays) from said function values, said amount I being given by formulas (1) and (2) below:

$$I = i_0 + \tfrac{1}{2} - \{f(i_0+1) - f(i_0)\}/A \quad (1)$$

where
$A = 2\{B_1 + K_1(B_1 - B_2)\}$
$B_1 = f(i_0-1) - f(i_0)$
$B_2 = f(i_0+2) - f(i_0+1)$
$k_1 =$ a constant between 0 and 0.5

$$I = i_0 - \tfrac{1}{2} + \{f(i_0-1) - f(i_0)\}/C \quad (2)$$

where
$C = 2\{D_1 + K_1(D_1 - D_2)\}$
$D_1 = f(i_0+1) - f(i_0)$
$D_2 = f(i_0-2) - f(i_0-1)$
$K_1 =$ a constant between 0 and 0.5 comparing said function value $f(i_0-1)$ with said function value $f(i_0+1)$ to judge whether
(a) $f(i_0-1) > f(i_0+1)$,
(b) $f(i_0-1) = f(i_0+1)$, or
(c) $f(i_0-1) < f(i_0+1)$; and obtaining said amount I given by said formula (1) in the case of (a), or given by $I = i_0$ in the case of (b), or given by said formula (2) in the case of (c).

3. A focus detection system in which light from an object is incident on first and second arrays of photosensors via an optical system to provide a first image impinging on the first array and a second image impinging on the second array, wherein the photosensors of the first array generate a pattern of signals $F(1)$, $F(2)$, $F(3)$, ... and the photosensors of the second array generate a pattern of signals $S(1)$, $S(2)$, $S(3)$, ... and wherein the photosensors of the arrays are disposed at a predetermined pitch, said system comprising:

means for evaluating a function $f(i)$ expressing inconsistency between the patterns of signals, where $$f(i) = \sum_j |F(i) - S(i+j)|$$

i = an integer representing the difference between a photosensor position in the first array and a photosensor position in the second array j = an integer representing a photosensor position in both arrays;

means for selecting, from the integers i, a value $i_0$ at which $f(i)$ is minimized; means for obtaining function values $f(i_0)$, $f(i_0-1)$, $f(i_0-2)$, $f(i_0+1)$ and $f(i_0+2)$ corresponding to $i_0$, $(i_0-1)$, $(i_0-2)$, $(i_0+1)$ and $(i_0+2)$, respectively;

means for computing an amount I from said function values, said amount I being given by formulas (1) and (2) below:

$$I = i_0 + \tfrac{1}{2} - \{f(i_0+1) - f(i_0)\}/A \quad (1)$$

where
$A = 2\{B_1 + K_1(B_1 - B_2)\}$
$B_1 = f(i_0-1) - f(i_0)$
$B_2 = f(i_0+2) - f(i_0+1)$
$k_1 =$ a constant between 0 and 0.5

$$I = i_0 - \tfrac{1}{2} + \{f(i_0-1) - f(i_0)\}/C \quad (2)$$

where
$C = 2\{D_1 + K_1(D_1 - D_2)\}$
$D_1 = f(i_0+1) - f(i_0)$
$D_2 = f(i_0-2) - f(i_0-1)$
$K_1 =$ a constant between 0 and 0.5;

means for comparing said function value $f(i_0-1)$ with said function value $f(i_0+1)$ to judge whether
(a) $f(i_0-1) > f(i_0+1)$,
(b) $f(i_0-1) = f(i_0+1)$, or
(c) $f(i_0-1) < f(i_0+1)$; and means for generating a defocus signal from said amount I given by said formula (1) in the case of (a), or given by $I = i_0$ in the case of (b), or given by said formula (2) in the case of (c), the defocus signal being used to control the position of the optical system.

* * * * *

UNITED STATES PATENT AND TRADEMARK OFFICE
CERTIFICATE OF CORRECTION

PATENT NO. : 4,883,951

DATED : November 28, 1989

INVENTOR(S) : Shotaro YOKOYAMA et al

It is certified that error appears in the above-identified patent and that said Letters Patent is hereby corrected as shown below:

In the heading of the patent, under item [75], "Nishinbe" should be --Nishibe--.

Signed and Sealed this

Nineteenth Day of March, 1991

*Attest:*

HARRY F. MANBECK, JR.

*Attesting Officer*      *Commissioner of Patents and Trademarks*